(12) United States Patent
van Thiel (10) Patent No.: US 12,420,769 B2
(45) Date of Patent: Sep. 23, 2025

(54) METHOD FOR TESTING A SELECT-HIGH VALVE

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 437 days.

(21) Appl. No.: 18/059,243

(22) Filed: Nov. 28, 2022

(65) Prior Publication Data

US 2023/0089211 A1    Mar. 23, 2023

Related U.S. Application Data

(63) Continuation of application No. PCT/EP2021/067859, filed on Jun. 29, 2021.

(30) Foreign Application Priority Data

Jul. 1, 2020    (DE) ............. 10 2020 117 324.5

(51) Int. Cl.
*B60T 17/22* (2006.01)
*B60T 13/26* (2006.01)
*B60T 13/68* (2006.01)

(52) U.S. Cl.
CPC ............ *B60T 17/221* (2013.01); *B60T 13/26* (2013.01); *B60T 13/683* (2013.01); *B60T 2270/88* (2013.01)

(58) Field of Classification Search
CPC ...... B60T 13/26; B60T 13/261; B60T 13/266; B60T 13/662; B60T 13/683; B60T 17/22;
(Continued)

(56) References Cited

U.S. PATENT DOCUMENTS 3,567,290 A    3/1971 Liggett et al.
4,527,770 A *  7/1985 Vanderburg ............ F16K 37/00
                                                                73/1.72
(Continued)

FOREIGN PATENT DOCUMENTS

DE    1 957 176 A1    7/1970
DE    101 42 790 A1   3/2003
(Continued)

OTHER PUBLICATIONS

EP-1288095-A2. (Year: 2003).*
(Continued)

*Primary Examiner* — Thomas J Williams
(74) *Attorney, Agent, or Firm* — Walter Ottesen, P.A.

(57) ABSTRACT

The disclosure relates to a method for testing a shuttle valve in a pneumatic system, wherein the shuttle valve has a first shuttle valve port, a second shuttle valve port and a third shuttle valve port, wherein the higher of the pressures prevailing at the first shuttle valve port and second shuttle valve port is modulated at the third shuttle valve port in each case, wherein the method includes the steps: a) modulating a first pressure at the first shuttle valve port; b) ascertaining a value, which is indicative of the first pressure, at the first shuttle valve port; and c) comparing the value indicative of the first pressure with a first predetermined comparison value provided for this, and, in the event of a deviation greater than a first tolerance: ascertaining and/or outputting a fault of the shuttle valve.

25 Claims, 6 Drawing Sheets

(58) Field of Classification Search
CPC ... B60T 17/221; B60T 17/226; B60T 2270/88
See application file for complete search history.

(56) References Cited

U.S. PATENT DOCUMENTS

| | | | | |
|---|---|---|---|---|
| 7,517,026 | B1* | 4/2009 | Herbst | B60T 7/20 |
| | | | | 303/3 |
| 8,282,173 | B2* | 10/2012 | Forster | B60T 13/263 |
| | | | | 303/7 |
| 2012/0299369 | A1* | 11/2012 | Wieder | B60T 17/221 |
| | | | | 303/113.1 |
| 2018/0029571 | A1* | 2/2018 | Schick | B60T 15/028 |
| 2019/0316333 | A1* | 10/2019 | Ball | F16K 15/066 |
| 2023/0089211 | A1* | 3/2023 | van Thiel | B60T 13/683 |
| | | | | 303/122.09 |

FOREIGN PATENT DOCUMENTS

| | | | |
|---|---|---|---|
| DE | 10 2015 116 317 A1 | 3/2017 | |
| EP | 1288095 A2 * | 3/2003 | ............ B60T 13/266 |

OTHER PUBLICATIONS

Translation of the Written Opinion of the International Searching Authority dated Oct. 7, 2021 for international application PCT/EP2021/067859 on which this application is based.

International Search Report of the European Patent Office dated Oct. 7, 2021 for international application PCT/EP2021/067859 on which this application is based.

* cited by examiner

METHOD FOR TESTING A SELECT-HIGH VALVE

CROSS REFERENCE TO RELATED APPLICATIONS

This application is a continuation application of international patent application PCT/EP2021/067859, filed Jun. 29, 2021, designating the United States and claiming priority from German application 10 2020 117 324.5, filed Jul. 1, 2020, and the entire content of both applications is incorporated herein by reference.

TECHNICAL FIELD

The disclosure relates to a method for testing a shuttle valve in a pneumatic system, preferably electronically controllable pneumatic brake system, wherein the shuttle valve has a first shuttle valve port, a second shuttle valve port and a third shuttle valve port, wherein the higher of the pressures prevailing at the first shuttle valve port and second shuttle valve port is modulated at the third shuttle valve port in each case. The disclosure furthermore relates to a pneumatic system, preferably electronically controlled pneumatic brake system, for a vehicle, preferably utility vehicle, having a shuttle valve of said type, and to a vehicle, preferably utility vehicle, having a pneumatic system of the above-stated type.

BACKGROUND

Shuttle valves that conduct the higher of the pressures that prevail at the first and second ports to the third port in each case are also referred to as "select-high valves". Such shuttle valves are widely used in brake systems, for example for the purposes of coupling redundant systems, conducting redundant pressures, or performing other control tasks. In the context of redundant systems in particular, shuttle valves may be used even in the case of relatively high levels of automation, in particular at SAE levels 2-5, in particular 3-5. It is important here that procedures and methods exist for testing such shuttle valves because, in the case of vehicles with relatively high levels of automation, human drivers are no longer unrestrictedly available for identifying faults.

In principle, for testing such shuttle valves, use could be made of additional special sensors that test the functionality of the shuttle valves. This is however complex, increases installation space and costs, and can scarcely be used economically over a broad range of applications. This is true in particular if one considers that a multiplicity of such shuttle valves is typically used in a brake system.

SUMMARY

It is an object of the present disclosure to specify a method for testing such shuttle valves, with which method straightforward, inexpensive and reliable testing of the shuttle valves is possible even during the operation of the vehicle.

In a first aspect, in the case of a method, the disclosure achieves the object by the steps: a) modulating a first pressure at the first shuttle valve port; b) ascertaining a value, which is indicative of the first pressure, at the first shuttle valve port; and c) comparing the value indicative of the first pressure with a first predetermined comparison value provided for this, and, in the event of a deviation greater than a first tolerance: ascertaining and/or outputting a fault of the shuttle valve.

The disclosure is based on the concept of ensuring fault-free functioning of a select-high valve through comparison of a value, which is indicative of the pressure prevailing at the first shuttle valve port, during aeration and ventilation. This means that, whilst the first pressure is modulated at the first shuttle valve port, the value indicative of said pressure is ascertained and is then compared with a corresponding comparison value in order to test the functionality of the shuttle valve. This may occur both by way of an extended test activation, for example as part of an extended launch control operation, and during ongoing operation, or whilst pressure is actively modulated.

Preferably, when a first pressure is modulated at the first shuttle valve port in step a), the second shuttle valve port is not pressurized but is preferably ventilated. There are however also embodiments, which will be described in more detail further below, in which pressure is modulated in parallel. If the first pressure is modulated at the first shuttle valve port whilst ambient pressure prevails at the second shuttle valve port, the shuttle valve should react such that the first pressure is provided at the third shuttle valve port.

A fault that may typically arise in shuttle valves is, on the one hand, a leak, which occurs for example in the event of jamming of a valve ball, or incorrect positioning of valve elements or the like. Leaks may exist between the first and third shuttle valve ports, the second and third shuttle valve ports, or the first and second shuttle valve ports. It is the intention that all of these faults be identified by way of the method.

It is in principle possible and preferable, for the modulation of the first, second and further pressures at the first and second shuttle valve ports, for said ports to be aerated proceeding from an ambient pressure, to be aerated proceeding from another pressure, or to be ventilated proceeding from a higher pressure, in order to attain the first or second or further pressure. For example, it may occur that, during operation, a maximum pressure is firstly modulated and then ventilation is performed from the maximum pressure to the first, second or further pressure in order to modulate the corresponding first, second or further pressure. In this way, too, a corresponding pressure can be provided at the first or second shuttle valve port.

A value indicative of the first pressure may for example be a pressure measured at a particular point in time, for example in MPa, or a pressure profile plotted over a particular duration, for example in MPa versus the time. First derivatives with respect to time of such values, that is, a pressure gradient at a particular point in time, a pressure gradient in a particular period of time or a pressure gradient profile over a particular duration, are particularly preferred. Gradient values in particular are preferable because they indicate the change with respect to time of the first pressure, from which the switching of the shuttle valve and the switching characteristic can preferably be ascertained.

After the first shuttle valve port has been tested in steps a) to c), the second shuttle valve port is preferably tested in further steps d) to f). For this purpose, preferably, in a step d), a second pressure is modulated at the second shuttle valve port; in step e), a value, which is indicative of the second pressure, is ascertained at the second shuttle valve port; and in step f), the value indicative of the second pressure is compared with a second predetermined comparison value provided for this, and, in the event of a deviation greater than a second tolerance, a fault is ascertained and/or output. During these steps, the first shuttle valve has preferably been ventilated to ambient pressure. That is, after the first shuttle valve port has been tested, this is preferably ventilated to ambient pressure before the second pressure is applied to the second shuttle valve port. In principle, the same statements as those made above with regard to the first shuttle valve port apply to the testing of the second shuttle valve port, and reference is therefore made to the statements.

In an embodiment, the method includes the step: g) comparing a difference between the value indicative of the first pressure and the value indicative of the second pressure with a predetermined first threshold value; and, if the first threshold value is undershot: ascertaining and/or outputting a fault of the shuttle valve. Shuttle valves should typically act symmetrically, such that, in the presence of known first or second pressures that are preferably identical, the difference between the respective values indicative of the first and second pressures is also known. Here, if a predetermined first threshold value is undershot, or if a magnitude of the difference overshoots the first preset threshold value, a fault is in turn preferably ascertained and/or output. An over- or undershooting of the first threshold value may be caused by a valve ball of the shuttle valve becoming jammed to one side, resulting in very different indicative values for the first and second pressures.

The above statements preferably relate to a so-called "sequential" modulation of first and second pressures, in the case of which the first and second pressures are modulated successively whilst the respective other of the first and second shuttle valve ports is ventilated. In an embodiment, however, parallel modulation is performed. It is preferred here that, in step d), as described above, the second pressure is modulated at the second shuttle valve port whilst the first pressure is already modulated at the first shuttle valve port. This means that, in this case, the first pressure is firstly modulated and maintained at the first shuttle valve port and then, after a predetermined period of time has elapsed, the second pressure is modulated at the second shuttle valve port. If the first and the second pressure are of the same magnitude and the shuttle valve is of symmetrical configuration, the indicative value ascertained for the first or second pressure should not change. The first pressure is passed through as before, and the shuttle valve does not switch over, when the second pressure is modulated, even if said second pressure is of the same magnitude. A deviation from this indicative value expected for the first or second pressure may in turn indicate a defect of the shuttle valve, such that a fault is ascertained and/or output.

The value indicative of the first pressure is particularly preferably a pressure gradient. The first predetermined comparison value is in this case a first comparison pressure gradient. The value indicative of the second pressure is also preferably a pressure gradient, specifically a second pressure gradient. The second predetermined comparison value is in this case a second comparison pressure gradient. It is preferably also possible in each case for multiple pressure gradients to be detected in a particular period of time, and thus for a pressure gradient profile to be obtained. Accordingly, in an embodiment, the value indicative of the first pressure is a pressure gradient profile, and the first predetermined comparison value is a first setpoint profile. The value indicative of the second pressure is also preferably a pressure gradient profile, and the second predetermined comparison value is a second setpoint profile. Identical statements may also apply to third, fourth, et cetera, pressures and to corresponding values indicative of the pressures.

The setpoint profile then relates to a change with respect to time of the pressure gradient, preferably proceeding from the modulation of the first pressure at the first shuttle valve port. Here, if a deviation is greater than a first predetermined tolerance, a fault is ascertained or else output. The fault may preferably be output to a driver, or else merely internally in a control unit, in order to bring the vehicle into a safe state.

In principle, the first and second pressures or other pressures may also be of different magnitudes. In this respect, it is preferable for the method to include the steps: modulating a third pressure, which is lower than a maximum pressure, at the second shuttle valve port; modulating a fourth pressure at the first shuttle valve port, wherein the fourth pressure is higher than the third pressure; ascertaining a pressure gradient profile versus the time at the first shuttle valve port; and ascertaining a deviation of the ascertained pressure gradient profile from a predetermined setpoint profile; and, if a deviation is identified: ascertaining and/or outputting a fault of the shuttle valve. If the third pressure is firstly modulated whilst the first shuttle valve port is ventilated, and then the fourth pressure is modulated whilst the third pressure is still modulated, the shuttle valve should switch over and connect the first shuttle valve port to the third shuttle valve port. This is because the fourth pressure is higher than the third pressure. In principle, the fourth pressure may also correspond to the first pressure. The switchover of the shuttle valve when the fourth pressure overshoots the third pressure results in a characteristic curve that corresponds to the setpoint profile. If the shuttle valve has a fault, the characteristic curve that is actually measured deviates from this setpoint profile, such that, in turn, a fault can be ascertained and/or output.

It is to be understood that this aspect may also be implemented independently of the first described aspect. That is, it is not imperatively necessary for steps a) to f) to firstly be performed as described above, but it is rather also preferable for the third pressure to initially be modulated, then for the fourth pressure to be modulated, and for a characteristic curve to thus be obtained which is compared with a setpoint characteristic curve.

In a further preferred embodiment, the method includes the steps: modulating a fifth pressure at the first shuttle valve port; modulating a sixth pressure at the second shuttle valve port whilst the fifth pressure is modulated, wherein the sixth pressure is a very low pressure; detecting a pressure prevailing at the second shuttle valve port versus the time; and, in the event of an increase of the pressure prevailing at the second shuttle valve port: ascertaining and/or outputting a fault of the shuttle valve. Provision may also be made for the sixth pressure to be modulated first, and for the fifth pressure to be modulated subsequently, or for both pressures to be modulated simultaneously. The sixth pressure is a very low pressure, preferably a minimum pressure, preferably the lowest possible pressure that the corresponding system can provide at the second shuttle valve port. For example, the magnitude of the pressure is in a range from 0.01 MPa to 0.05 MPa. In the case of the detection of the increase of the pressure prevailing at the second shuttle valve port, either in the form of a pressure value measured in MPa or in the form of the gradient, measured in MPa/s, use is in turn preferably made of a threshold value that allows for a certain tolerance range. If the pressure at the second shuttle valve port increases over time, this may be an indication that air is flowing across from the first shuttle valve port to the second shuttle valve port. This should normally be prevented in shuttle valves, and in the present embodiment, the pressure from the first shuttle valve port should be provided only at the third shuttle valve port, whereas no pressure from the second shuttle valve port is modulated at the first or at the third shuttle valve port.

Since it is however also conceivable in principle that the module that modulates the sixth pressure at the second shuttle valve port has a leak, and owing to the leak the pressure at the second shuttle valve port increases over time, the method preferably includes the following steps: ventilating the first shuttle valve port from the fifth pressure to ambient pressure, and modulating the sixth pressure at the second shuttle valve port; detecting the pressure prevailing at the second shuttle valve port versus the time; and, if the pressure prevailing at the second shuttle valve port remains within a predetermined tolerance range: ascertaining and/or outputting a fault of the shuttle valve. These steps are performed subsequently to the steps described above. If the pressure at the second shuttle valve port increases whilst the fifth pressure is modulated, but does not increase if no pressure is modulated at the first shuttle valve port, this is an indication that the module connected to the second shuttle valve port does not have a leak, but air is flowing across from the first to the second shuttle valve port. In this specific situation, the fault should then be ascertained or output. The pressure may in turn be ascertained as a pressure value or pressure profile, measured for example in MPa, or as a derivative thereof with respect to time, that is, as a pressure gradient or pressure gradient profile, measured for example in MPa/s.

In an embodiment, provision is furthermore made whereby the method includes the step: ascertaining the present reservoir pressure; wherein at least the above-described step c) is performed taking into consideration the ascertained present reservoir pressure. Gradients or gradient profiles may differ in a manner dependent on the magnitude of the reservoir pressure, such that the reservoir pressure is preferably taken into consideration. The same also applies to the above-described step f). A higher reservoir pressure can lead to a proportionally higher pressure gradient, such that, by taking into consideration the reservoir pressure, the ascertained pressure gradients and pressure gradient profiles can be normalized.

The predetermined comparison value with which the value indicative of the first pressure is compared is preferably a value that has been learned on the basis of previously measured values. The value indicative of the first pressure, and also the other values such as the value indicative of the second pressure, are preferably detected and stored during the normal operation of the vehicle. These values are referred to as learned values. If a deviation from these values is then identified, this is an indication that the shuttle valve is defective. This may apply to all values indicative of pressure, in particular individual pressure values, pressure profiles, gradients and gradient profiles.

It is also preferable that the first and the second gradient and the first and second gradient profiles at the first and second shuttle valve ports are compared with one another in order to thereby identify a fault. In a further embodiment, provision is made whereby at least the first predetermined comparison value is received from an internal memory medium and/or wirelessly from a cloud service. The same preferably also applies to the further values, such as the second predetermined comparison value, the predetermined first threshold value and the predetermined setpoint profile and other comparison values for a first and second gradient profile, and further values used herein. On the one hand, it is conceivable for such values to be stored in advance in an internal memory by a manufacturer, and to be updated as necessary during servicing. On the other hand, it is also conceivable and preferable for such values to be provided via a cloud service. This then allows updating on a server, and the corresponding provision of the values via the cloud service. Here, it is also possible for further characteristics, such as service life, operating hours and the like, to be jointly taken into consideration.

For the connection to a cloud service, a corresponding interface is preferably provided, which receives the one or more corresponding values wirelessly. For this purpose, a vehicle on which the above-described method is executed may include a radio module, for example an LTE module or the like.

In a further embodiment, provision is made whereby a first valve module, preferably a first axle modulator, is connected to the first shuttle valve port, and a second valve module, preferably a second axle modulator, is connected to the second shuttle valve port, wherein the first and second valve modules electronically communicate indirectly or directly with one another, and wherein the third shuttle valve port is connected to a consumer, preferably brake actuator. It is preferable for a first axle modulator to be provided for normal operation, and the second axle modulator to be provided for redundancy operation, of the vehicle. The indirect or direct communication between the first and second axle modulators then serves for the transmission of both operating signals and failure signals, fault signals and the like. Indirect communication may take place for example via an interposed further module, the vehicle bus or the like. In specifically such cases, the functionality of the shuttle valve is crucial if, in a redundancy situation, the second axle modulator must take over in order to reliably brake the vehicle.

The steps of the method are preferably performed during a braking operation of a vehicle, wherein the first pressure is a first brake pressure for braking the vehicle. It is preferable for the functionality of the shuttle valve to be tested, in accordance with the above steps, every time the first brake pressure is provided for braking the vehicle. In this case, it is not necessary for a separate test routine to be implemented or performed for the vehicle, such that, overall, an efficient testing process can be performed.

It is furthermore preferable that the steps of the method are performed when the vehicle is at a standstill, wherein the method furthermore includes the step: receiving a launch control signal for executing a launch control operation; and, in response to the receipt of the launch control signal: at least performing steps a) to c). In this embodiment, the method, at least steps a) to c), preferably further steps, are performed as part of an extended launch control operation for the vehicle. In this way, the overall safety of the vehicle can be increased.

In a second aspect, the disclosure achieves the object stated above via a pneumatic system, wherein, aside from the shuttle valve mentioned in the introduction, a first valve module is also included, which is connected to the first shuttle valve port in order to modulate a first pressure at the first shuttle valve port and which includes a first pressure sensor for detecting a value indicative of the first pressure; and furthermore, a second valve module is provided, which is connected to the second shuttle valve port in order to modulate a second pressure at the second shuttle valve port and which includes a second pressure sensor for detecting a value indicative of the second pressure; and furthermore, an electronic control unit is included, which is connected to the first and second valve units for the purposes of receiving first and second pressure signals from the first and second pressure sensors, wherein the electronic control unit furthermore has means suitable for performing the steps of the method according to the first aspect of the disclosure.

The pneumatic system is preferably part of an electronically controllable pneumatic brake system for a utility vehicle, in particular a utility vehicle of a relatively high automation level, in particular SAE level 3, 4 or 5. The means suitable for performing the steps of the method according to the first aspect of the disclosure preferably include a processor and a memory on which software code is stored.

In a first embodiment of the pneumatic system, the first valve unit is configured as a first axle modulator and the second valve unit is configured as a second axle modulator, wherein the third shuttle valve port is fluidically connected to a brake actuator.

It can furthermore be preferable if the first axle modulator is configured and provided for normal operation of the vehicle, and the second axle modulator is configured and provided for a redundancy situation in which the first axle modulator cannot operate or cannot operate correctly. A reason for the failure of the first axle modulator may be that a superordinate system has failed, or else a fault has occurred directly within the first axle modulator.

It can furthermore be preferable that a path downstream of the third shuttle valve port has no further pressure sensor. The third shuttle valve port is preferably connected directly, or via a short hose or pipe arrangement, to the brake actuator. The test in accordance with the method of the first aspect of the disclosure is preferably implemented exclusively using sensors in the first and second valve units. In particular, the pressure prevailing at the first shuttle valve port is detected via the first pressure sensor, and the pressure prevailing at the second shuttle valve port is detected via the second pressure sensor. From these, the corresponding values indicative of the first and second pressures, for example pressure gradients and pressure gradient profiles, can be determined. There is no need, and also no provision in the context of the disclosure, for further sensors.

In a third aspect, the object stated above is achieved via a vehicle, preferably utility vehicle, having a pneumatic system according to any one of the above-described embodiments of a pneumatic system according to the second aspect of the disclosure.

In a fourth aspect, the object stated above is achieved via a computer program including commands that cause the pneumatic system according to any one of the above-described embodiments of a pneumatic system according to the second aspect of the disclosure to perform the method steps according to any one of the above-described embodiments of the method according to the first aspect of the disclosure.

BRIEF DESCRIPTION OF DRAWINGS

The invention will now be described with reference to the drawings wherein.

DETAILED DESCRIPTION

A pneumatic system 100 according to a first embodiment (FIG. 1) has a shuttle valve 2, which is of a conventional configuration. The shuttle valve 2 has a first shuttle valve port 2.1, a second shuttle valve port 2.2, and a third shuttle valve port 2.3. The shuttle valve 2 is configured such that the higher of the pressures prevailing at the first and second shuttle valve ports 2.1, 2.2 is modulated at the third shuttle valve port 2.3 in each case. The shuttle valve 2 is accordingly also referred to as a "select-high valve". Such select-high valves are widely used in electropneumatic brake systems and form standard components.

Figure 1:
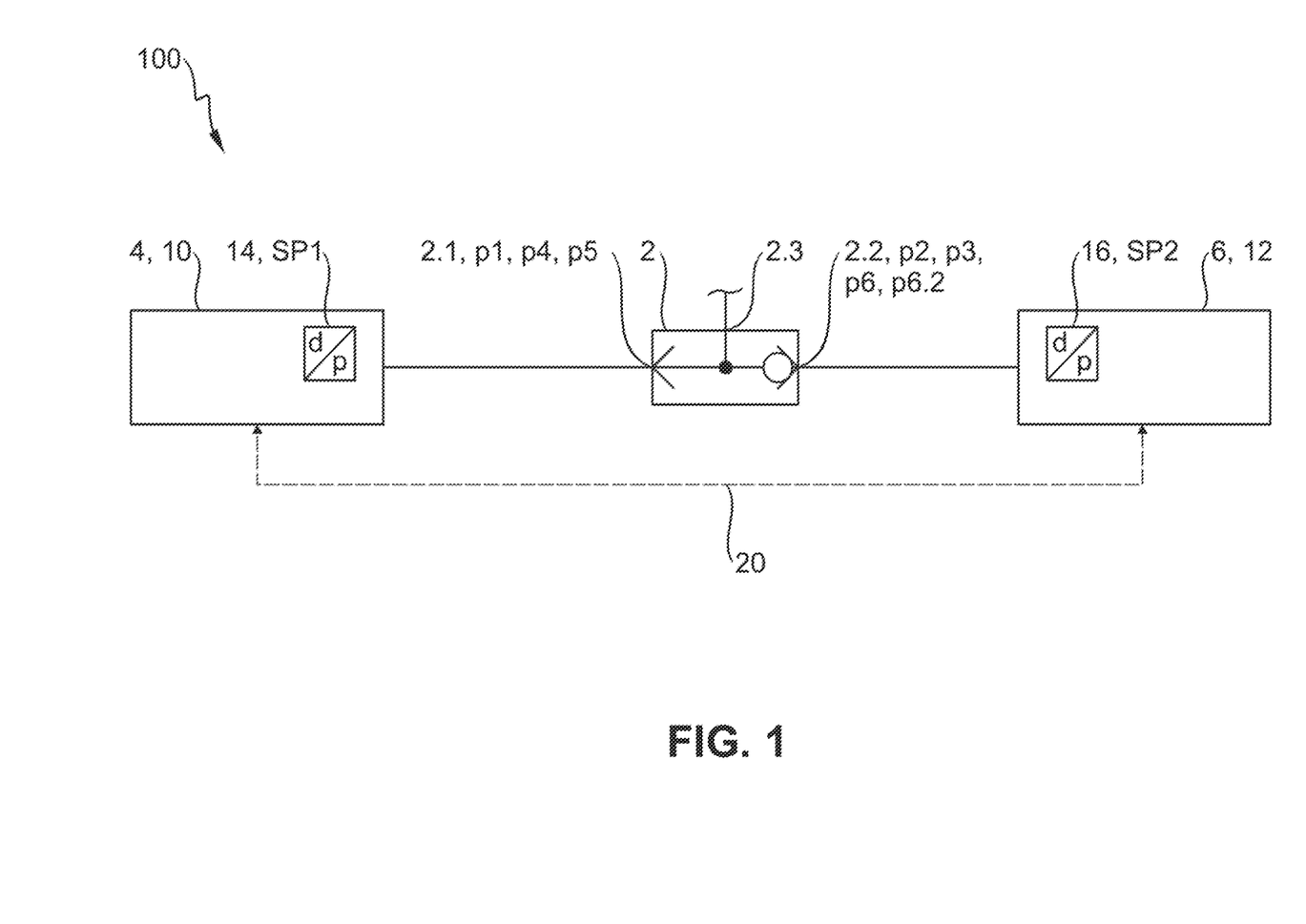
FIG. 1 shows a pneumatic system according to a first embodiment.

In the embodiment shown in FIG. 1, the first shuttle valve port 2.1 is connected to a first valve module 4 and the second shuttle valve port 2.2 is connected to a second valve module 6. The third shuttle valve port 2.3 may be connected to a consumer, in particular a brake actuator 8 (cf. FIG. 3). It is however also possible for other consumers to be connected to the third shuttle valve port 2.3, for example (not shown) modulators, spring-type accumulators, brake cylinders, trailer control valves and the like.

Figure 2:
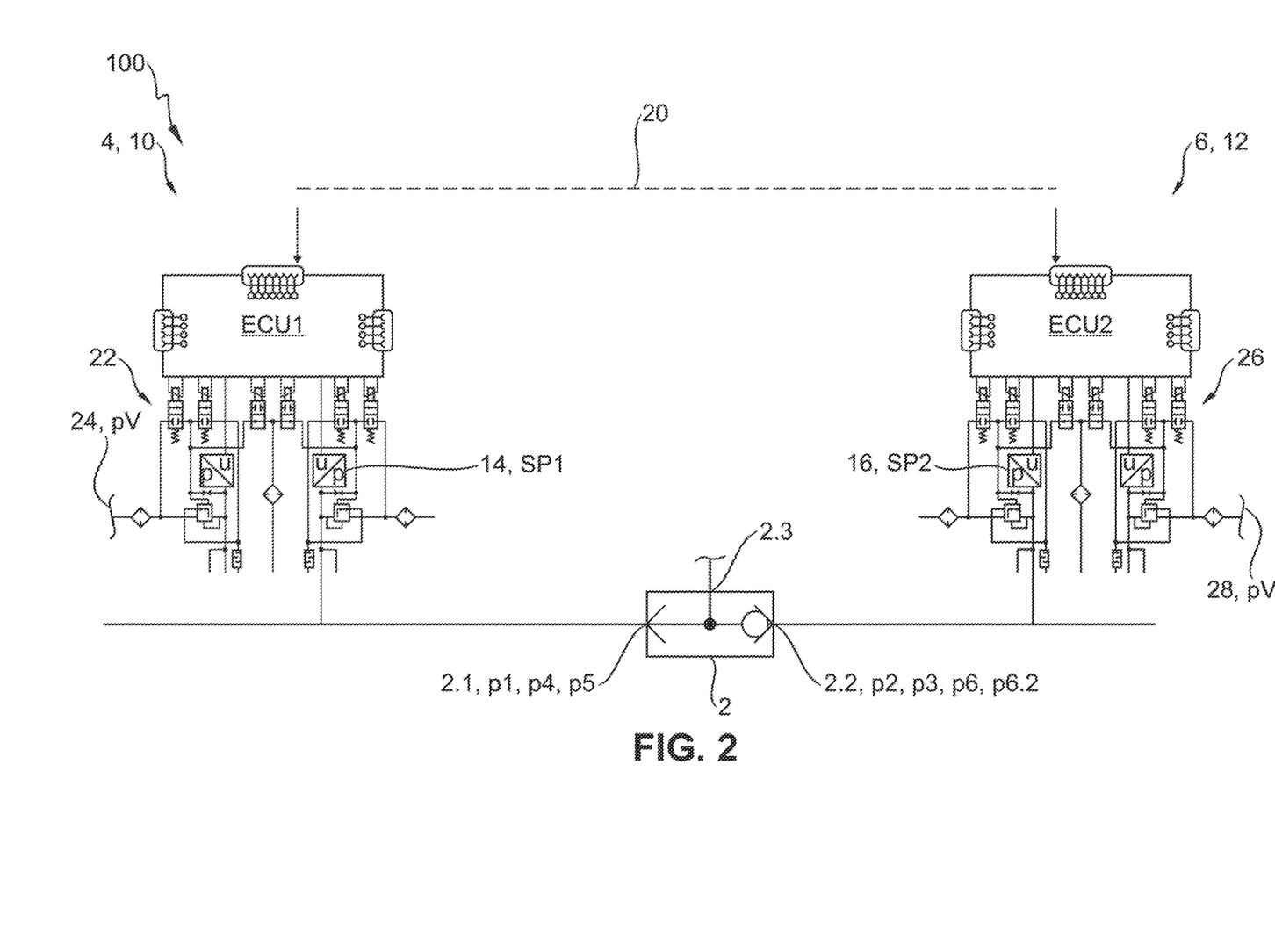
FIG. 2 shows a pneumatic system according to a second embodiment.

The first and second valve modules 4, 6 may preferably, as shown in the second embodiment as per FIG. 2, be configured as first and second axle modulators 10, 12. This will be described in more detail further below.

The first valve module 4 serves for modulating at least one first pressure p1 at the first shuttle valve port 2.1. The first valve module 4 may furthermore modulate further pressures, as will be described in more detail further below, at the first shuttle valve port 2.1. To detect the pressure that is modulated at the first shuttle valve port 2.1, the first valve module 1 includes a first pressure sensor 14, which provides a first pressure signal SP1. Correspondingly, the second valve module 6 is configured to modulate at least one second pressure p2 at the second shuttle valve port 2.2. The second valve module 6 may furthermore modulate further pressures at the second shuttle valve port 2.2, as will be described in more detail further below. The second valve module 6 includes a second pressure sensor 16, which is provided for detecting the pressure that is modulated at the second shuttle valve port 2.2 and providing a corresponding second pressure signal SP2.

As can also be seen from FIG. 1, the first and second valve module 4, 6 may communicate with one another. In this regard, a signal line 20 between the valve modules is indicated. The signal line 20 is in this case merely illustrative and is intended to show that the first and second valve module 4, 6 may communicate indirectly or directly with one another. The signal line 20 may for example be formed by a direct cable connection between the first and second valve modules 4, 6, as a vehicle bus which connects yet further modules (not shown here) to one another, or else as an indirect connection via a further module (likewise not shown). The signal line 20 may however also be formed by multiple signal lines. The first and second pressure signals SP1, SP2 are also preferably provided via the signal line 20.

In a first practical embodiment as shown in FIG. 2, the first valve module 4 is formed by a first axle modulator 10, and the second valve module 6 is formed by a second axle modulator 12. In this embodiment (FIG. 2), the first axle modulator 10 has a dedicated intelligence in the form of a first electronic control unit ECU1. The second valve module 6, which is configured here as a second axle modulator 12, likewise has a dedicated intelligence, in this case in the form of a second electronic control unit ECU2.

Aside from the first electronic control unit ECU1 and the first pressure sensor 14, the first valve module 4 has a first valve arrangement 22, which is not described in detail here but which serves to receive reservoir pressure pV from a reservoir port 24 of the first valve module 4 and to provide this as first pressure p1, for example, at the first shuttle valve port 2.1. This is performed in a manner dependent on the switching configuration of one or more switching valves within the first valve arrangement 22. The construction of axle modulators is known in principle, such that the exact construction does not need to be discussed in any more detail here. The second valve module 6, which is configured here as a second axle modulator 12, is of corresponding construction and has a second valve arrangement 26, which receives reservoir pressure pV via a second reservoir port 28. In a manner dependent on the switching position of the one or more switching valves of the second valve arrangement 26, at least the second pressure p2 is modulated at the second shuttle valve port 2.2. The reservoir pressure pV may be provided by one or else by two different compressed-air reservoirs, as will be discussed in more detail with regard to FIG. 3. In the embodiment shown in FIG. 2, the first pressure sensor 14 is connected to the first electronic control unit ECU1 and provides the first pressure signal SP1 to the first electronic control unit. The first electronic control unit ECU1 is then connected to the signal line 20, and is capable of providing the first pressure signal SP1 via the signal line to further units, in particular to the second valve module 6. Provision may however also be made for the first electronic control unit ECU1 to provide, via the signal line 20, a signal that is derived from the first pressure signal SP1. Correspondingly, the second pressure sensor 16 of the second valve module 6 is also connected to the second electronic control unit ECU2, and provides the second pressure signal SP2 to the second electronic control unit. The second electronic control unit ECU2 is then in turn connected to the signal line 20, and is capable of providing the second pressure signal SP2 to the signal line. Provision may likewise be made for the second electronic control unit ECU2 to provide, via the signal line 20, signals that are derived from the second pressure signal SP2.

Figure 3:
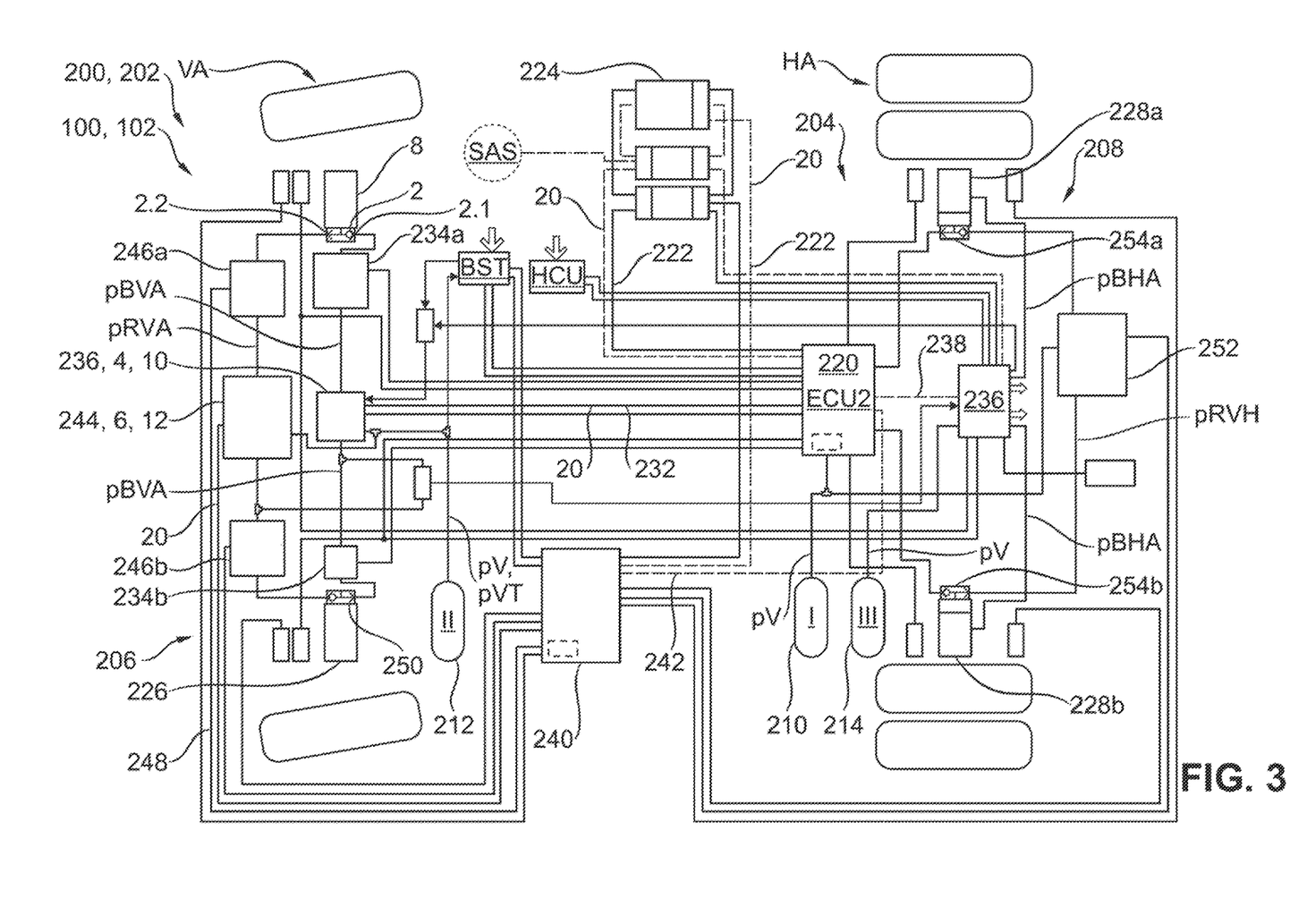
FIG. 3 shows a vehicle having a brake system.

FIG. 3 shows the pneumatic system 100 in an installed situation in a brake system 102. More specifically, FIG. 3 illustrates a vehicle 200, specifically a utility vehicle 202, which includes an electronically controllable pneumatic brake system 102 of the type with the above-described pneumatic system 100. The vehicle 200 has a front axle VA and a rear axle HA, though may also include further rear axles in addition to this. The brake system 102 has a rear axle brake circuit 204, a front axle brake circuit 206 and a parking brake circuit 208. The rear axle brake circuit 204 is fed from a first compressed air reservoir 210, the front axle brake circuit 206 is fed from a second compressed air reservoir 212, and the parking brake circuit 208 is fed from a third compressed air reservoir 214. All three compressed air reservoirs 210, 212, 214 provide a reservoir pressure pV.

To control the brake system 102, a central unit 220 is provided, which has a central electronic control unit ECUZ. The central unit 220 is connected via a vehicle bus 222 to a unit for autonomous driving 224, in order to receive control signals, braking demand signals or the like therefrom. The vehicle bus 222 also forms a part of the signal line 20.

At the front axle VA, the brake system 102 includes a brake actuator 8, which in this case is provided at the right-hand front wheel of the front axle VA. At the left-hand front wheel of the front axle VA, the brake system 102 includes a further brake actuator 226, and at the rear axle HA, the brake system includes rear axle brake actuators 228a, 228b. At the front axle VA, the brake system 102 furthermore includes a front axle modulator 230, which in this case is provided in the form of the first axle modulator 10, or in the form of the first valve module 4. The front axle modulator 230 is connected via a front axle brake signal line 232 to the central unit 220, and receives switching signals therefrom. Furthermore, the front axle modulator 230 is connected to the second compressed-air reservoir 212 and receives reservoir pressure pV therefrom. The front axle modulator 230 is configured to modulate a front axle brake pressure pBVA in a manner dependent on signals received via the front axle brake signal line 232, which in turn forms a part of the signal line 20. This is performed in a manner that is known in principle. The front axle brake pressure pBVA is then provided to the brake actuator 8 and to the further brake actuator 226, in this case via first and second ABS valves 234a, 234b, in order to implement braking appropriate to each wheel.

Similarly, at the rear axle HA, a rear axle modulator 236 is provided, which is connected to the first compressed air reservoir 210 and via a rear axle brake signal line 238 to the central unit 220. The rear axle modulator 236 modulates a rear axle brake pressure pBHA at the rear axle brake actuators 228a, 228b.

For the event that a fault arises in the brake system 102, for example in a unit for autonomous driving 224, in the central unit 20 or in one of the front axle modulator 230 and the rear axle modulator 236, the brake system 102 includes a redundant central unit 240, which is likewise connected via the vehicle bus 222 to the unit for autonomous driving 224 and via an internal signal line 242 to the central unit 220. The redundant central unit 240 is provided for performing the control of the brake system 102 in the event of a fault.

Aside from the redundant central unit 240, the brake system 102 also includes a redundant front axle modulator 244, in this case in the form of the second axle modulator 12 or of the second valve module 6. The redundant front axle modulator 244 is likewise connected, via redundant front axle ABS valves 246a, 246b, to the brake actuator 8 and to the further brake actuator 226 respectively. In the event of a fault, the redundant central unit 240 controls the redundant front axle modulator 244 in order to thus redundantly modulate the front axle brake pressure pBVA. For this purpose, the redundant front axle modulator 244 is also connected to the second compressed air reservoir 212, and via a redundant front axle brake signal line 248 to the redundant central unit 240. The redundant front axle brake signal line 248 also forms a part of the signal line 20. In this way, the redundant front axle modulator 244 is connected via the redundant front axle brake signal line 248, the redundant central unit 240, the central unit 220 and the front axle brake signal line 232 to the front axle modulator 230 in order to thus exchange signals and communicate therewith.

The shuttle valve 2 is connected between the ABS valve 234a and redundant front axle ABS valve 246a and the brake actuator 8, and a further shuttle valve 250 is connected between the ABS valve 234b and redundant front axle ABS valve 246b and the further brake actuator 226. Primarily the valve 2 will be described below, wherein it is to be understood that the shuttle valve 250 is constructed in the same way and functions in the same way. More specifically, the right-hand ABS valve 234a is connected to the first shuttle valve port 2.1, and the right-hand redundant front axle ABS valve 246a is connected to the second shuttle valve port 2.2. The third shuttle valve port 2.3 is in this case connected directly to the brake chamber of the brake actuator 8.

An identical circuit arrangement is also provided for the further brake actuator 226. For the rear axle brake circuit 204, a redundant rear axle modulator 252 is provided which, in a fault situation, can replace the rear axle modulator 236. The redundant rear axle modulator is also connected via first and second rear axle shuttle valves 254a, 254b to the rear axle brake actuators 228a, 228b, as has already been described in principle with regard to the front axle VA. This connection will therefore not be discussed in any more detail here.

Altogether, the brake system 102 therefore has four shuttle valves, specifically the shuttle valve 2, the further shuttle valve 250 and the first and second rear axle shuttle valves 254a, 254b. These serve in principle to conduct the front axle brake pressure pBVA and rear axle brake pressure pBHA respectively to the corresponding brake actuators during normal operation. If the redundant central unit 240 has to take over in the event of a fault, the front axle brake pressure pBVA and the rear axle brake pressure pBHA are then modulated via the redundant front axle modulator 244 and redundant rear axle modulator 252 respectively, and thus provided via the corresponding shuttle valves to the corresponding brake actuators. It is therefore important that the shuttle valves all function correctly.

To test the shuttle valves 2, 250, 254a, 254b, the method according to the disclosure for testing a shuttle valve is performed preferably while the vehicle 200 is at a standstill or during the operation of the vehicle 200. The testing of the shuttle valve 2 may be performed both as part of an extended launch control operation, before the commencement of travel with the vehicle 200, or else during the operation of the vehicle 200, for example during the modulation of the front axle brake pressure pBVA and/or of the rear axle brake pressure pBHA. In the course of the method, it is preferable for the following steps to firstly be performed: modulating a first pressure p1 at the first shuttle valve port 2.1; ascertaining a value, which is indicative of the first pressure p1, at the first shuttle valve port 2.1; and comparing the value indicative of the first pressure with a first predetermined comparison value provided for this. In an embodiment, the value indicative of the first pressure takes the form either of a first pressure gradient G1 or of a pressure gradient profile G1T at the first shuttle valve port 2.1. Following a comparison of the first pressure gradient G1 or pressure gradient profile G1T with a first predetermined comparison value GV1 or, in the case of the pressure gradient profile G1T, with the first setpoint profile GS1, a fault E of the shuttle valve 2 is ascertained and/or output if a deviation is greater than a first tolerance T1.

Figure 4:
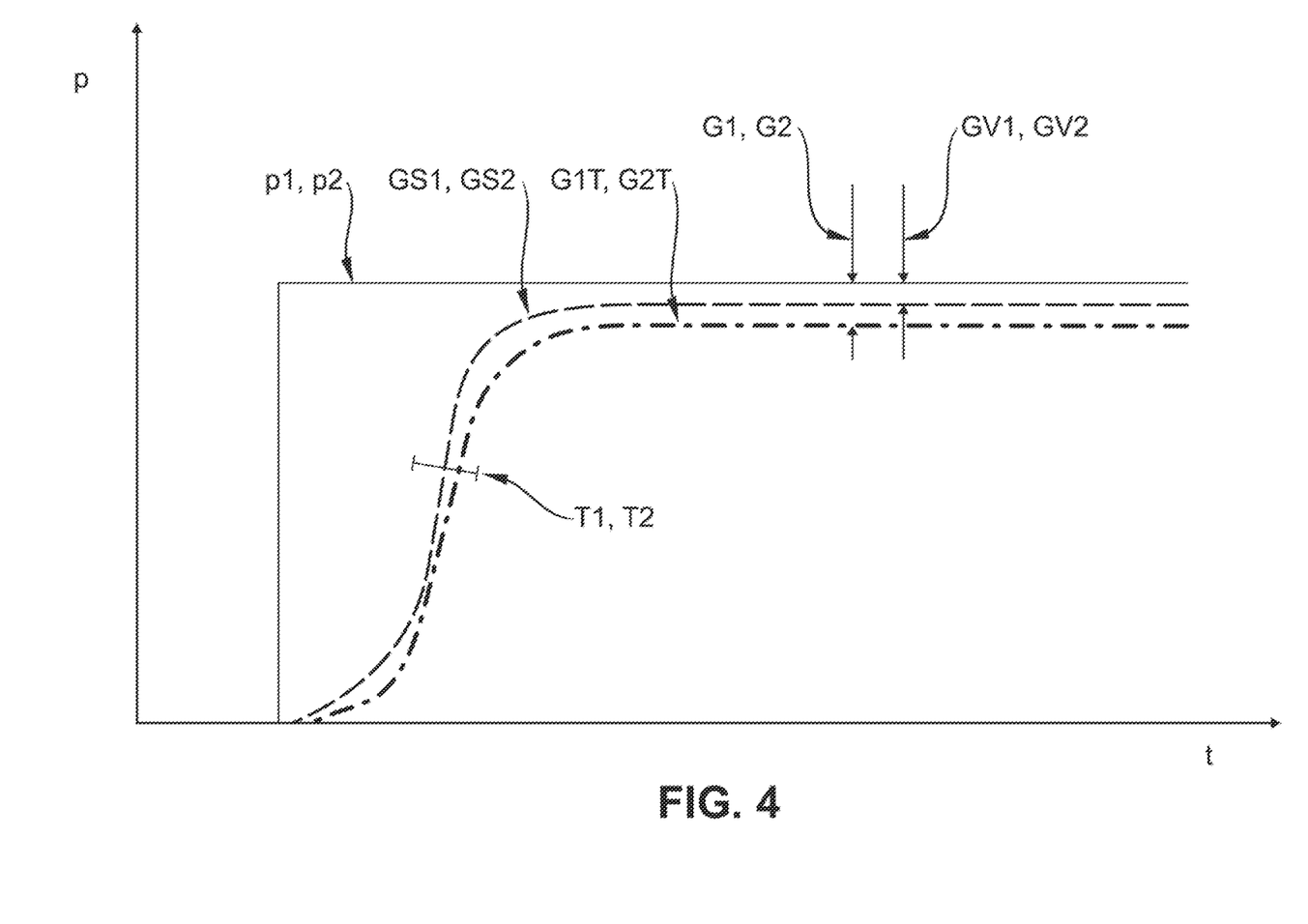
FIG. 4 shows a diagram with pressure gradients.
Figure 5:
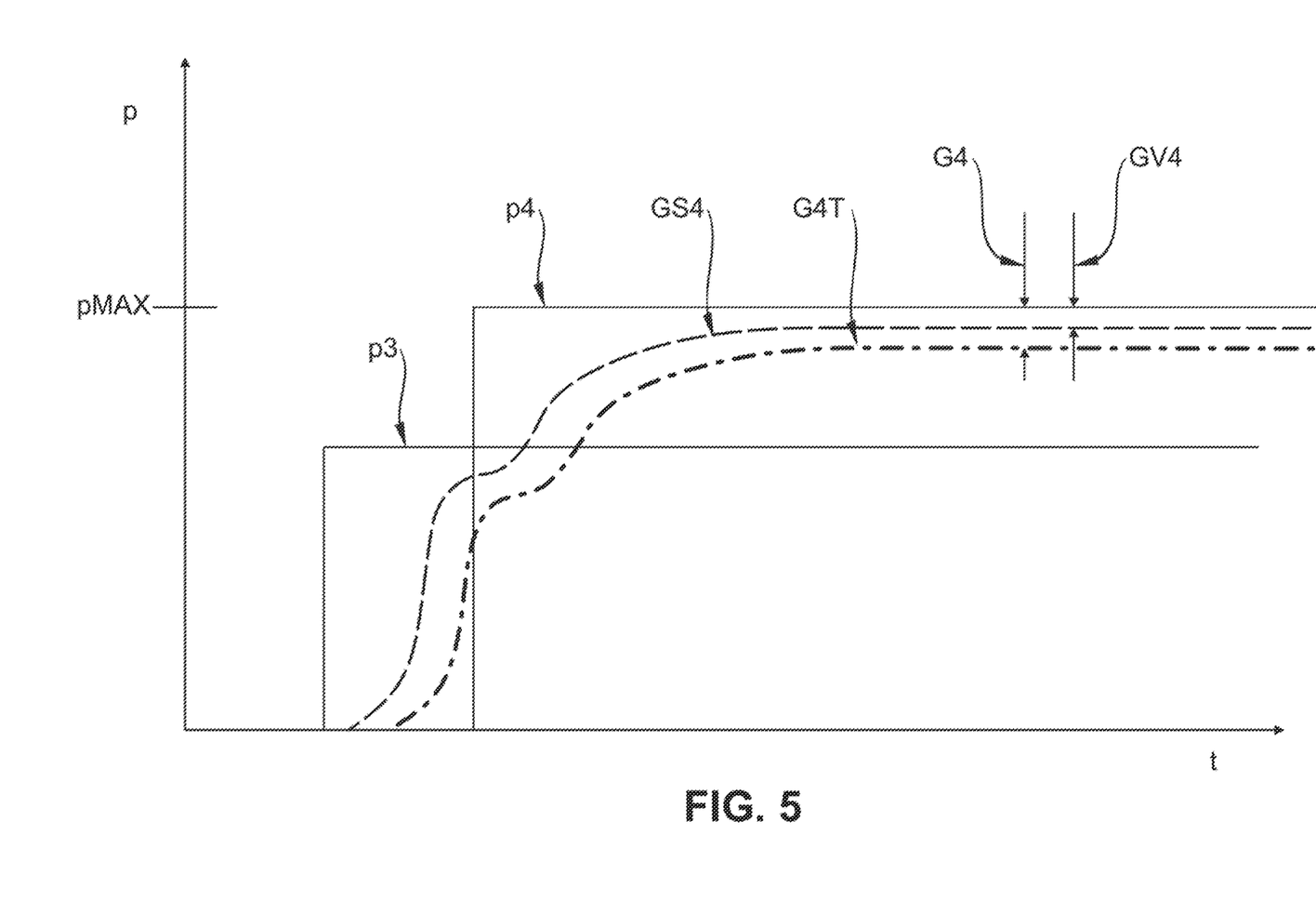
FIG. 5 shows a second diagram with pressure gradients.
Figure 6:
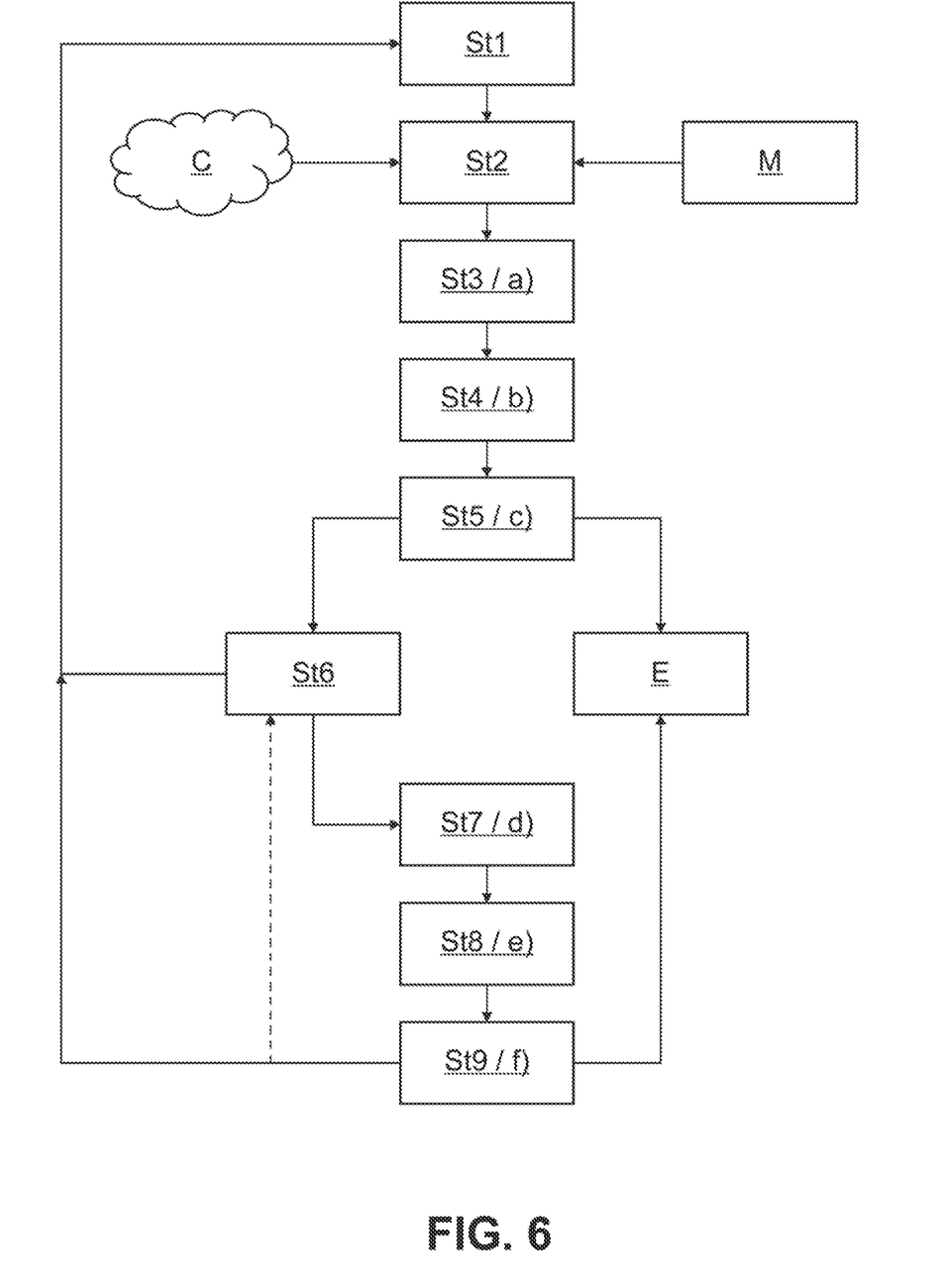
FIG. 6 shows a schematic sequence of the method.

Such a method sequence is illustrated in FIG. 6, while FIGS. 4 and 5 show the various values indicative of the first and second pressure in the form of pressure gradients and pressure gradient profiles, and will be described in detail below. It is to be understood that other values, in particular absolute pressure values, or pressure gradients in a particular time interval may be utilized as values indicative of a pressure.

In FIG. 6, it is for example firstly the case that, in step St1, the testing method is initialized. In step St2, it is then for example possible for tolerances, setpoint profiles and other comparison values to be retrieved from an internal memory M in the central unit 220 or the first or second electronic control unit ECU1, ECU2. It is alternatively also possible in step St2 for such values to be obtained by way of a cloud service C. In step St3, the first pressure p1 may then be modulated at the first shuttle valve port 2.1 by the first valve module 4 (cf. FIGS. 1 to 3). If, in this step, no pressure is modulated at the second shuttle valve port 2.2, but rather ambient pressure p0 prevails at the second shuttle valve port, the first pressure p1 that is modulated at the first shuttle valve port 2.1 is provided, through the shuttle valve 2, at the third shuttle valve port 2.3. This results in a characteristic first pressure gradient G1 and a first pressure gradient profile G1T. This is graphically illustrated in FIG. 4.

FIG. 4 illustrates (both for the first pressure p1 and for the second pressure p2) the reaction of the shuttle valve 2. If the first pressure p1, illustrated here as a step function, is modulated at the first shuttle valve port 2.1, the shuttle valve 2 reacts and modulates this pressure at the third shuttle valve port 2.3. Also plotted in FIG. 4 is a first setpoint profile GS1 for the first pressure gradient profile G1T and a first comparison value GV1. As can be seen from FIG. 4, both the first pressure gradient profile GS1 and the first pressure gradient G1 lie below the first setpoint profile GS1 and the first comparison value GV1. However, both still lie within the first tolerance T1, which is plotted by way of example only at one point on the graph. For as long as the first pressure gradient profile G1T and/or the first pressure gradient G1 lie within the first tolerance T1, no fault E is output. That is, in step St4, the first pressure gradient G1 or the first pressure gradient profile G1T is firstly ascertained at the first shuttle valve port 2.1, and in step St5, the comparison is then performed, and it is ascertained whether the ascertained value lies within the tolerance T1. If the ascertained value lies within the tolerance T1, the method is ended in step St6. The method may then recommence with step St1, for example after a specified time, a restart of the vehicle 200, or the like. However, if a value is ascertained which lies outside the first tolerance T1, a fault E is output. The fault E may be output either to a superordinate unit, for example to the unit for autonomous driving 224, or else to the driver of the vehicle 200 by way of a display.

It is however also possible, after step St6, to test the shuttle valve 2 further, specifically in particular the second shuttle valve port 2.2. If this is to be performed, then in step St7, a second pressure p2 is modulated at a second shuttle valve port 2.2, preferably whilst the first shuttle valve port 2.1 is ventilated, that is, while ambient pressure p0 prevails at the first shuttle valve port. In step St8, a second gradient G2 or a second pressure gradient profile G2T is ascertained at the second shuttle valve port 2.2. Then, in step St9, the ascertained second pressure gradient G2 or second pressure gradient profile G2T is compared with a second predetermined comparison value GV2 and/or with a second setpoint profile GS2. The second predetermined comparison value GV2 and the second setpoint profile GS2 have preferably already been retrieved from the memory M or the cloud C in step St2. Then, in step St9, a comparison is in turn performed and, if the measured values of the second pressure gradient G2 or of the second pressure gradient profile G2T lie within the second tolerance T2, either step St6 is returned to, and the method is ended, or step St1 is returned to, in order to restart the method immediately or at a later point in time. If, however, it is determined in step St9 that the measured values lie outside the second tolerance T2, the fault E is output. The second pressure gradient profile G2T and the second pressure gradient G2 are plotted in FIG. 4.

It is however also possible that the first pressure p1 and the second pressure p2 are not modulated strictly successively, that is, sequentially, at the first and second shuttle valve ports 2.1, 2.2, but that pressures are modulated partially or entirely in parallel. Such an illustration is shown in FIG. 5. In FIG. 5, in a method for testing the shuttle valve 2, it is firstly the case that a third pressure p3 is modulated at the second shuttle valve port 2.2, wherein the third pressure p3 is lower than a maximum pressure pMAX that the second valve module 6 can modulate. At this point in time, the first shuttle valve port 2.1 is initially still ventilated, and ambient pressure p0 prevails. After the second shuttle valve port 2.2 has been aerated with the third pressure p3, the first shuttle valve port 2.1 is then aerated with a fourth pressure p4 by the first valve module 4, with the maximum pressure pMAX in the embodiment shown in FIG. 5. If the shuttle valve 2 is functioning correctly, it would then have to switch over and no longer pass the third pressure p3 through from the second shuttle valve port 2.2 to the third shuttle valve port 2.3, but pass the fourth pressure p4 through from the first shuttle valve port 2.1 to the third shuttle valve port 2.3. This in turn results in a fourth pressure gradient G4 and a fourth pressure gradient profile G4T. The fourth setpoint profile GS4 and the fourth comparison value GV4 are also plotted in FIG. 5. Here, too, it can again be checked whether the fourth pressure gradient profile G4T adequately corresponds to the fourth setpoint profile GS4, and whether the fourth pressure gradient G4 lies within a tolerance range (not shown) for the fourth comparison value GV4.

A further method that can be used for testing the shuttle valve 2 is as follows: A fifth pressure p5 is firstly modulated at the first shuttle valve port 2.1 (cf. FIG. 1). The fifth pressure p5 may in turn correspond to the maximum pressure pMAX, or a slightly graduated pressure. Subsequently, at the same time or even beforehand, a sixth pressure p6 is modulated at the second shuttle valve port 2.2, which sixth pressure is preferably a very low pressure, in particular a minimum pressure or the lowest possible pressure that can be implemented via the second valve module 6. For example, the sixth pressure p6 is in a range from 0.01 to 0.05 MPa. Subsequently, in turn, the pressure prevailing at the second shuttle valve port 2.2 is detected versus the time. This is implemented via the second pressure sensor 16. The detected pressure p6.2 is observed. If this detected observed pressure p6.2 increases over time, this is an indication that the shuttle valve 2 is defective, and that the fifth pressure p5 is flowing across to the second shuttle valve port 2.2. That is, if the gradient ascertained in this way overshoots a threshold value assigned to it, a fault E is ascertained and/or output. In order to verify this, it is then possible in a further step for the first shuttle valve port 2.1 to be ventilated to ambient pressure p0, and in turn for the sixth pressure p6 to be modulated at the second shuttle valve port 2.2. In turn, the prevailing pressure p6.2 is observed, and if this does not increase, that is, the corresponding gradient is approximately 0, this is strongly indicative that the shuttle valve 2 is defective. In this case, the fault E is then ascertained and/or output.

It is understood that the foregoing description is that of the preferred embodiments of the invention and that various changes and modifications may be made thereto without departing from the spirit and scope of the invention as defined in the appended claims.

LIST OF REFERENCE DESIGNATIONS PART OF THE DESCRIPTION

2 Shuttle valve
2.1 First shuttle valve port
2.2 Second shuttle valve port
2.3 Third shuttle valve port
4 First valve module
6 Second valve module
8 Brake actuator
10 First axle modulator
12 Second axle modulator
14 First pressure sensor
16 Second pressure sensor
20 Signal line
22 First valve arrangement
24 First supply port
26 Second valve arrangement
28 Second supply port
100 Pneumatic system
102 Electronically controllable pneumatic brake system
200 Vehicle
202 Utility vehicle
204 Rear axle brake circuit
206 Front axle brake circuit
208 Parking brake circuit
210 First compressed-air reservoir
212 Second compressed-air reservoir
214 Third compressed-air reservoir
220 Central unit
222 Vehicle bus
224 Unit for autonomous driving
226 Further brake actuator (front axle VA)
228a, 228b Rear axle brake actuators
230 Front axle modulator
232 Front axle brake signal line
234a, 234b ABS valves
236 Rear axle modulator
238 Rear axle brake signal line
240 Redundant central unit
242 Internal signal line
244 Redundant front axle modulator
246a, 246b Redundant front axle ABS valves
248 Redundant front axle brake signal line
250 Further shuttle valve
252 Redundant rear axle modulator
254a, 254b Rear axle shuttle valves
C Cloud service
E Fault
ECU1 First electronic control unit
ECU2 Second electronic control unit
ECUZ Electronic control unit of the central unit
G1 First pressure gradient
G2 Second pressure gradient
G4 Fourth pressure gradient
G1T First pressure gradient profile
G2T Second pressure gradient profile
G4T Fourth pressure gradient profile
GS1 First setpoint profile
GS2 Second setpoint profile
GS4 Fourth setpoint profile
GV1 First comparison value
GV2 Second comparison value
GV4 Fourth comparison value
M Memory
T1 First tolerance
T2 Second tolerance
p1 First pressure
p2 Second pressure
p3 Third pressure
p4 Fourth pressure
p5 Fifth pressure
p6 Sixth pressure
p6.2 Observed sixth pressure
pBHA Rear axle brake pressure
pBVA Front axle brake pressure
pMAX Maximum pressure
pV Reservoir pressure
SP1 First pressure signal
SP2 Second pressure signal

The invention claimed is:

1. A method for testing a shuttle valve in a pneumatic system, wherein the shuttle valve has a first shuttle valve port, a second shuttle valve port, and a third shuttle valve port, wherein a higher one of pressures prevailing at the first shuttle valve port and second shuttle valve port is modulated at the third shuttle valve port, the method comprising:
   modulating a first pressure at the first shuttle valve port;
   ascertaining a first value indicative of the first pressure at the first shuttle valve port;
   comparing the first value indicative of the first pressure with a first predetermined comparison value, and, in the event of a deviation greater than a first tolerance: at least one of ascertaining and outputting a fault of the shuttle valve;
   after the first shuttle valve port has been tested, ventilating said first shuttle valve port to ambient pressure;
   thereafter, modulating a second pressure at the second shuttle valve port;
   ascertaining a second value indicative of the second pressure at the second shuttle valve port;
   comparing the second value indicative of the second pressure with a second predetermined comparison value, and,
   in the event of a deviation greater than a second tolerance: at least one of ascertaining and outputting the fault of the shuttle valve.

2. A computer program comprising program code configured, when executed by a processor, to cause the pneumatic system to perform the method of claim 1, wherein the pneumatic system includes the shuttle valve, a first valve module, and a second valve module; the shuttle valve has the first shuttle valve port, the second shuttle valve port, and the third shuttle valve port, wherein the higher one of the pressures prevailing at the first shuttle valve port and the second shuttle valve port is modulated at the third shuttle valve port; the first valve module is connected to said first shuttle valve port to modulate the first pressure at said first shuttle valve port; the first valve module has a first pressure sensor configured to detect the first value indicative of the first pressure; the second valve module is connected to said second shuttle valve port in order to modulate the second pressure at said second shuttle valve port; the second valve module has a second pressure sensor configured to detect the value indicative of the second pressure; and, the pneumatic system further has an electronic control unit connected to said first valve module and said second valve module for receiving a first pressure signal from said first pressure sensor and a second pressure signal from said second pressure sensor; and, wherein said program code is stored on a non-transitory computer readable medium.

3. The method of claim 1 further comprising:
   comparing a difference between the first value indicative of the first pressure and the second value indicative of the second pressure with a predetermined first threshold value; and, if the first threshold value is undershot: at least one of ascertaining and outputting the fault of the shuttle valve.

4. The method of claim 1, wherein said modulating said second pressure at the second shuttle valve port includes the second pressure being modulated at the second shuttle valve port while the first pressure is already modulated at the first shuttle valve port.

5. The method of claim 1, wherein the first value indicative of the first pressure is a pressure gradient; and, the first predetermined comparison value is a first comparison pressure gradient.

6. The method of claim 1, wherein the first value indicative of the first pressure is a pressure gradient profile; and, the first predetermined comparison value is a first setpoint profile.

7. The method of claim 1 further comprising:
   modulating a third pressure at the second shuttle valve port, wherein the third pressure is lower than a maximum pressure;
   modulating a fourth pressure at the first shuttle valve port, wherein the fourth pressure is higher than the third pressure;
   ascertaining a pressure gradient profile versus a time at the first shuttle valve port; and,
   ascertaining a deviation of the ascertained pressure gradient profile from a predetermined setpoint profile; and, if a deviation is identified: at least one of ascertaining and outputting the fault of the shuttle valve.

8. The method of claim 7 comprising the steps:
   modulating a fifth pressure at the first shuttle valve port;
   modulating a sixth pressure at the second shuttle valve port while the fifth pressure is modulated, wherein the sixth pressure is a very low pressure; and,
   detecting a pressure prevailing at the second shuttle valve port versus a time; and, in the event of an increase of the pressure prevailing at the second shuttle valve port: at least one of ascertaining and outputting the fault of the shuttle valve.

9. The method of claim 8, comprising the steps:
   ventilating the first shuttle valve port from the fifth pressure to ambient pressure and modulating the sixth pressure at the second shuttle valve port; and,
   detecting the pressure prevailing at the second shuttle valve port versus the time; and, if the pressure prevailing at the second shuttle valve port remains within a predetermined tolerance range: at least one of ascertaining and outputting the fault of the shuttle valve.

10. The method of claim 1 further comprising ascertaining a present reservoir pressure; wherein at least said comparing the first value indicative of the first pressure with the first predetermined comparison value is performed taking into consideration the ascertained present reservoir pressure.

11. The method of claim 1, wherein at least the first predetermined comparison value is a value learned on a basis of previously measured values.

12. The method of claim 1 further comprising retrieving at least the first predetermined comparison value from at least one of an internal memory medium and wirelessly from a cloud service.

13. The method of claim 1, wherein a first valve module is connected to the first shuttle valve port; a second valve module is connected to the second shuttle valve port; the first valve module and the second valve module electronically communicate indirectly or directly with one another; and, the third shuttle valve port is connected to a consumer.

14. The method of claim 13, wherein the first valve module is a first axle modulator; the second valve module is a second axle modulator; and, the consumer is a brake actuator.

15. The method of claim 13, wherein the method is performed during a braking operation of a vehicle; and, the first pressure is a first brake pressure for braking the vehicle.

16. The method of claim 13, wherein the method is performed when a vehicle is at a standstill, the method further comprising:
   receiving a launch control signal for executing a launch control operation; and, in response to the receipt of the launch control signal, at least performing: said modulating the first pressure at the first shuttle valve port, said ascertaining the first value indicative of the first pressure at the first shuttle valve port, and, said comparing the first value indicative of the first pressure with the first predetermined comparison value.

17. The method of claim 1, wherein the pneumatic system is an electronically controllable pneumatic brake system.

18. A pneumatic system for a vehicle, the pneumatic system comprising:
a shuttle valve having a first shuttle valve port, a second shuttle valve port, and a third shuttle valve port, wherein a higher one of pressures prevailing at said first shuttle valve port and said second shuttle valve port is modulated at the third shuttle valve port;
a first valve module connected to said first shuttle valve port in order to modulate a first pressure at said first shuttle valve port;
said first valve module having a first pressure sensor configured to detect a first value indicative of the first pressure;
a second valve module connected to said second shuttle valve port in order to modulate a second pressure at said second shuttle valve port;
said second valve module having a second pressure sensor configured to detect a second value indicative of the second pressure; and,
an electronic control unit connected to said first valve module and said second valve module for receiving a first pressure signal from said first pressure sensor and a second pressure signal from said second pressure sensor;
said electronic control unit being configured to:
modulate the first pressure at the first shuttle valve port;
ascertain the first value indicative of the first pressure at the first shuttle valve port; and,
compare the first value indicative of the first pressure with a first predetermined comparison value, and, in the event of a deviation greater than a first tolerance: at least one of ascertaining and outputting a fault of said shuttle valve.

19. The pneumatic system of claim 18, wherein said first valve module is a first axle modulator; said second valve module is a second axle modulator; and, said third shuttle valve port is fluidically connected to a brake actuator.

20. The pneumatic system of claim 19, wherein said first axle modulator is configured and provided for normal operation of the vehicle; and, said second axle modulator is configured and provided for a redundancy situation in which said first axle modulator cannot operate or cannot operate correctly.

21. The pneumatic system of claim 19, wherein a path downstream of said third shuttle valve port has no further pressure sensor.

22. The pneumatic system of claim 18, wherein the pneumatic system is an electronically controllable pneumatic brake system.

23. A vehicle comprising the pneumatic system of claim 18.

24. A method for testing a shuttle valve in a pneumatic system, wherein the shuttle valve has a first shuttle valve port, a second shuttle valve port, and a third shuttle valve port, wherein a higher one of pressures prevailing at the first shuttle valve port and second shuttle valve port is modulated at the third shuttle valve port, the method comprising:
modulating a first pressure at the first shuttle valve port;
ascertaining a first value indicative of the first pressure at the first shuttle valve port;
comparing the first value indicative of the first pressure with a first predetermined comparison value, and, in the event of a deviation greater than a first tolerance: at least one of ascertaining and outputting a fault of the shuttle valve;
comparing a difference between the first value indicative of the first pressure and a second value indicative of a second pressure with a predetermined first threshold value; and,
if the first threshold value is undershot: at least one of ascertaining and outputting the fault of the shuttle valve.

25. A method for testing a shuttle valve in a pneumatic system, wherein the shuttle valve has a first shuttle valve port, a second shuttle valve port, and a third shuttle valve port, wherein a higher one of pressures prevailing at the first shuttle valve port and second shuttle valve port is modulated at the third shuttle valve port, the pneumatic system having a first valve module connected to said first shuttle valve port in order to modulate a first pressure at said first shuttle valve port and a second valve module connected to said second shuttle valve port in order to modulate a second pressure at said second shuttle valve port;
wherein the first valve module is a first axle modulator, the second valve module is a second axle modulator; and, the third shuttle valve port is fluidically connected to a brake actuator, the method comprising:
modulating a first pressure at the first shuttle valve port;
ascertaining a first value indicative of the first pressure at the first shuttle valve port; and,
comparing the first value indicative of the first pressure with a first predetermined comparison value, and, in the event of a deviation greater than a first tolerance: at least one of ascertaining and outputting a fault of the shuttle valve.

* * * * *